United States Patent
Cheung

(10) Patent No.: US 8,796,870 B2
(45) Date of Patent: Aug. 5, 2014

(54) HYDRO-MECHANICAL ELECTRIC POWER GENERATOR AND METHOD OF GENERATING ELECTRIC POWER

(76) Inventor: Wai Hing Cheung, Hong Kong (HK)

( * ) Notice: Subject to any disclaimer, the term of this patent is extended or adjusted under 35 U.S.C. 154(b) by 346 days.

(21) Appl. No.: 13/227,457

(22) Filed: Sep. 7, 2011

(65) Prior Publication Data

US 2012/0169066 A1    Jul. 5, 2012

(30) Foreign Application Priority Data

Dec. 31, 2010    (HK) .................................. 10112304

(51) Int. Cl.
*H02K 7/18* (2006.01)
*F03B 17/04* (2006.01)

(52) U.S. Cl.
CPC . *F03B 17/04* (2013.01); *Y02E 10/20* (2013.01)
USPC ............................................ 290/1 R; 60/495

(58) Field of Classification Search
USPC ........................................ 290/1 R, 53; 60/495
See application file for complete search history.

(56) References Cited

U.S. PATENT DOCUMENTS

| | | | | |
|---|---|---|---|---|
| 459,280 A | * | 9/1891 | Garrett | 417/329 |
| 5,001,357 A | * | 3/1991 | Adams | 290/1 R |
| 8,089,167 B2 | * | 1/2012 | Alvite | 290/1 C |
| 8,456,027 B1 | * | 6/2013 | Seehorn | 290/1 R |
| 2006/0267346 A1 | * | 11/2006 | Chen | 290/54 |
| 2007/0278800 A1 | * | 12/2007 | Galich | 290/1 R |
| 2008/0264056 A1 | * | 10/2008 | Tung | 60/496 |
| 2009/0127864 A1 | | 5/2009 | Alvite | |

FOREIGN PATENT DOCUMENTS

| | | |
|---|---|---|
| CN | 100342130 C | 10/2007 |
| CN | 101135291 A | 3/2008 |

OTHER PUBLICATIONS

English Machine Translation for CN101135291.*
English Machine Translation for CN100342130.*
1st Office Action of counterpart Chinese Patent Application No. 201110269144.3 issued on Nov. 21, 2013.

* cited by examiner

*Primary Examiner* — Michael Zarroli

(57) ABSTRACT

An electric power generator having two water tanks, and two chambers movable up and down inside the two water tanks respectively in opposite directions. Each chamber has a top wall having an air outlet covered by a pressure valve, and a bottom wall having a plurality of apertures serving as both water inlets and outlets. An electric motor drivably connected to two chains from which the two chambers are hung respectively. Upper and lower electromagnetic holding devices provided at top and bottom of each water tank for holding or releasing the chambers. Continuous up and down movement of the two chambers in opposite directions by buoyancy and gravity alternately and continuously drives the electric motor to generate electric power. A method of generating electric power is also disclosed.

17 Claims, 3 Drawing Sheets

HYDRO-MECHANICAL ELECTRIC POWER GENERATOR AND METHOD OF GENERATING ELECTRIC POWER

CROSS-REFERENCE TO RELATED APPLICATIONS

This application claims priority of Hong Kong patent application No. 10112304.4 filed on Dec. 31, 2010, the entire content of which is hereby incorporated by reference.

TECHNICAL FIELD

The present application relates to an electric power generator and a method of generating electric power.

BACKGROUND

The currently existing power plants basically use coal, oil or nuclear energy to generate energy. The required energy is generated by the conversion of thermal energy to mechanical energy, and then to electrical energy. However, the storage of oil, coal and uranium in the world is decreasing day by day. Resource development is increasingly high in cost and resource development is very dangerous. During a mining process, serious coal mine disasters, casualties and other serious accidents can easily occur.

In addition, burning of coal, oil and other fuels produces large amount of sulfur dioxide and other chemicals into the atmosphere. This causes serious air pollution, increase in carbon dioxide emission and global warming. This greatly affects the human health. Nuclear power requires a small amount of uranium fuel before production. However, after production, nuclear fuel waste, though small in size, contains radioactive material. Usually, the nuclear fuel waste will have to be kept over several decades before it is considered safe and would not affect the ecological environment. The nuclear fuel waste must be treated with great care. In case of accident, radioactive substance will be released into the outside environment and will cause serious damage to the ecological environment and human. Thus the risk of using nuclear energy is relatively high. Wind power, hydraulic power and solar power generation belong to the category of energy regeneration. The damage of these kinds of power generation to the ecological environment is relatively small. However, the generation of power by wind, water and solar energy is limited. The power generation efficiency is not stable and is greatly affected by the weather condition. They are also high in repair and maintenance costs, leading to high electricity costs and low in economic benefit.

There is a need to provide an improved electric power generator and an improved method of generating electric power that is more effective and reliable, safe to the ecological environment and low in costs.

The above description of the background is provided to aid in understanding an electric power generator, but is not admitted to describe or constitute pertinent prior art to the electric power generator disclosed in the present application, or consider any cited documents as material to the patentability of the claims of the present application.

SUMMARY

According to one aspect, there is provided an electric power generator including:
first and second water tanks;
first and second chambers movable up and down inside the first and second water tanks respectively in opposite directions, each chamber comprising a top wall having an air outlet covered by a pressure valve, and a bottom wall having a plurality of apertures serving as both water inlets and outlets;
an electric motor drivably connected to first and second chains from which the first and second chambers are hung respectively;
an upper electromagnetic holding device provided at top of each water tank for holding the chamber therein at the top where its pressure valve is opened, water is drawn into the chamber through the apertures and air is expelled out of the chamber through the air outlet, and for releasing the chamber thereby allowing it to drop by gravity to the bottom of the water tank and pull the chain to drive the electric motor; and
a lower electromagnetic holding device provided at the bottom of each water tank for holding the chamber therein at the bottom where its pressure valve is closed, air is pumped into the chamber and water is expelled out of the chamber through the apertures, and for releasing the chamber thereby allowing it to float by buoyancy to the top of the water tank;
whereby continuous up and down movement of the first and second chambers in opposite directions alternately and continuously drives the electric motor to generate electric power.

The electric power generator may further include a plurality of ear loops formed around the periphery of each chamber and a plurality of vertical guide posts formed inside each water tank, the vertical guide posts being inserted through corresponding ear loops for slidable engagement therewith. The electric power generator may also include an air inlet pipe provided at the bottom of each water tank through which air is pumped into each chamber, the air inlet pipe being insertable into the chamber through a central opening formed at the center of the bottom wall of the chamber.

In one embodiment, each water tank has a height of at least 30 meters. The first and second water tanks and the first and second chambers may be cylindrical in shape. Each chamber may have a height of about 1 meter and a diameter of about 2 meters. The weight of the first chamber can be the same as the weight of the second chamber.

According to another aspect, there is provided an electric power generator including:
first and second chambers movable up and down inside two columns of water respectively in opposite directions, each chamber comprising a top wall having an air outlet covered by a pressure valve, and a bottom wall having a plurality of apertures serving as both water inlets and outlets;
an electric motor drivably connected to first and second chains from which the first and second chambers are hung respectively;
an upper electric holding device provided at top of each column of water for holding the chamber therein at the top where its pressure valve is opened, water is drawn into the chamber through the apertures and air is expelled out of the chamber through the air outlet, and for releasing the chamber thereby allowing it to drop by gravity to the bottom of the column of water and pull the chain to drive the electric motor; and
a lower electric holding device provided at the bottom of each column of water for holding the chamber therein at the bottom where its pressure valve is closed, air is pumped into the chamber and water is expelled out of the chamber through the apertures, and for releasing the chamber thereby allowing it to float by buoyancy to the top of the column of water;

whereby continuous up and down movement of the first and second chambers in opposite directions alternately and continuously drives the electric motor to generate electric power.

The electric power generator may further include a plurality of ear loops formed around the periphery of each chamber and a plurality of vertical guide posts formed inside each column of water, the vertical guide posts being inserted through corresponding ear loops for slidable engagement therewith. The electric power generator may also include an air inlet pipe provided at the bottom of each column of water through which air is pumped into each chamber, the air inlet pipe being insertable into the chamber through a central opening formed at the center of the bottom wall of the chamber.

In one embodiment, each column of water has a height of at least 30 meters. Each column of water can be contained in a water tank. The water tanks and the chambers may be cylindrical in shape. Each chamber may have a height of about 1 meter and a diameter of about 2 meters.

According to yet another aspect, there is provided a method of generating electric power including the steps of:

providing a first chamber movable up and down inside a first water tank, the first chamber comprising a top wall having an air outlet covered by a first pressure valve, and a bottom wall having a plurality of apertures serving as both water inlets and outlets;

providing an electric motor drivably connected to a first chain from which the first chamber is hung;

providing upper and lower electric holding devices at top and bottom of the first water tank respectively for holding or releasing the first chamber;

de-activating the upper electric holding device of the first water tank that is holding the first chamber at the top of the first water tank, thereby allowing the first chamber to drop by gravity to the bottom of the first water tank and pull the first chain to drive the electric motor and generate electric power;

activating the lower electric holding device of the first water tank to hold the first chamber at the bottom of the first water tank, and pumping air into the first chamber thereby expelling water out of the first chamber through the apertures;

de-activating the lower electric holding device of the first water tank thereby allowing the first chamber to float by buoyancy back to the top of the first water tank;

activating the upper electric holding device of the first water tank to hold the first chamber at the top of the first water tank, and opening the first pressure valve thereby drawing water into the first chamber through the apertures and expelling air out of the first chamber through the air outlet; and repeating the steps (d) to (g).

The method of generating electric power may further include the steps of:

providing a second chamber movable up and down inside a second water tank, the second chamber comprising a top wall having an air outlet covered by a pressure valve, and a bottom wall having a plurality of apertures serving as both water inlets and outlets;

drivably connecting the electric motor to a second chain from which the second chamber is hung;

providing upper and lower electric holding devices at top and bottom of the second water tank respectively for holding or releasing the second chamber;

de-activating the upper electric holding device of the second water tank that is holding the second chamber at the top of the second water tank, thereby allowing the second chamber to drop by gravity to the bottom of the second water tank and pull the second chain to drive the electric motor and generate electric power;

activating the lower electric holding device of the second water tank to hold the second chamber at the bottom of the second water tank, and pumping air into the second chamber through the air inlet provided at the bottom of the second water tank thereby expelling water out of the second chamber through the apertures;

de-activating the lower electric holding device of the second water tank thereby allowing the second chamber to float by buoyancy back to the top of the second water tank;

activating the upper electric holding device of the second water tank to hold the second chamber at the top of the second water tank, and opening the second pressure valve thereby drawing water into the second chamber through the apertures and expelling air out of the second chamber through the air outlet; and repeating the steps (d) to (g) such that the continuous up and down movement of the first and second chambers in opposite directions alternately and continuously drive the electric motor to generate electric power.

When the pressure valve of the first chamber is open, the pressure valve of the second chamber can be closed, and vice versa. The upper electric holding device of the first chamber and the lower electric holding device of the second chamber can be activated or deactivated simultaneously; and the upper electric holding device of the second chamber and the lower electric holding device of the first chamber can be activated or de-activated simultaneously. When the upper electric holding device of the first chamber and the lower electric holding device of the second chamber are activated, the upper electric holding device of the second chamber and the lower electric holding device of the first chamber can be de-activated, and vice versa.

In one embodiment, the electric holding devices are electromagnetic holding devices, whereby the chambers are held by electromagnetic force generated by the electromagnetic holding devices.

Although the electric power generator disclosed in the present application is shown and described with respect to certain embodiments, it is obvious that equivalents and modifications will occur to others skilled in the art upon the reading and understanding of the specification. The present application includes all such equivalents and modifications, and is limited only by the scope of the claims.

BRIEF DESCRIPTION OF THE DRAWINGS

Specific embodiments of the electric power generator disclosed in the present application will now be described by way of example with reference to the accompanying drawings wherein.

DETAILED DESCRIPTION

Reference will now be made in detail to a preferred embodiment of the electric power generator disclosed in the present application, examples of which are also provided in the following description. Exemplary embodiments of the electric power generator disclosed in the present application are described in detail, although it will be apparent to those skilled in the relevant art that some features that are not particularly important to an understanding of the electric power generator may not be shown for the sake of clarity.

Figure 1:
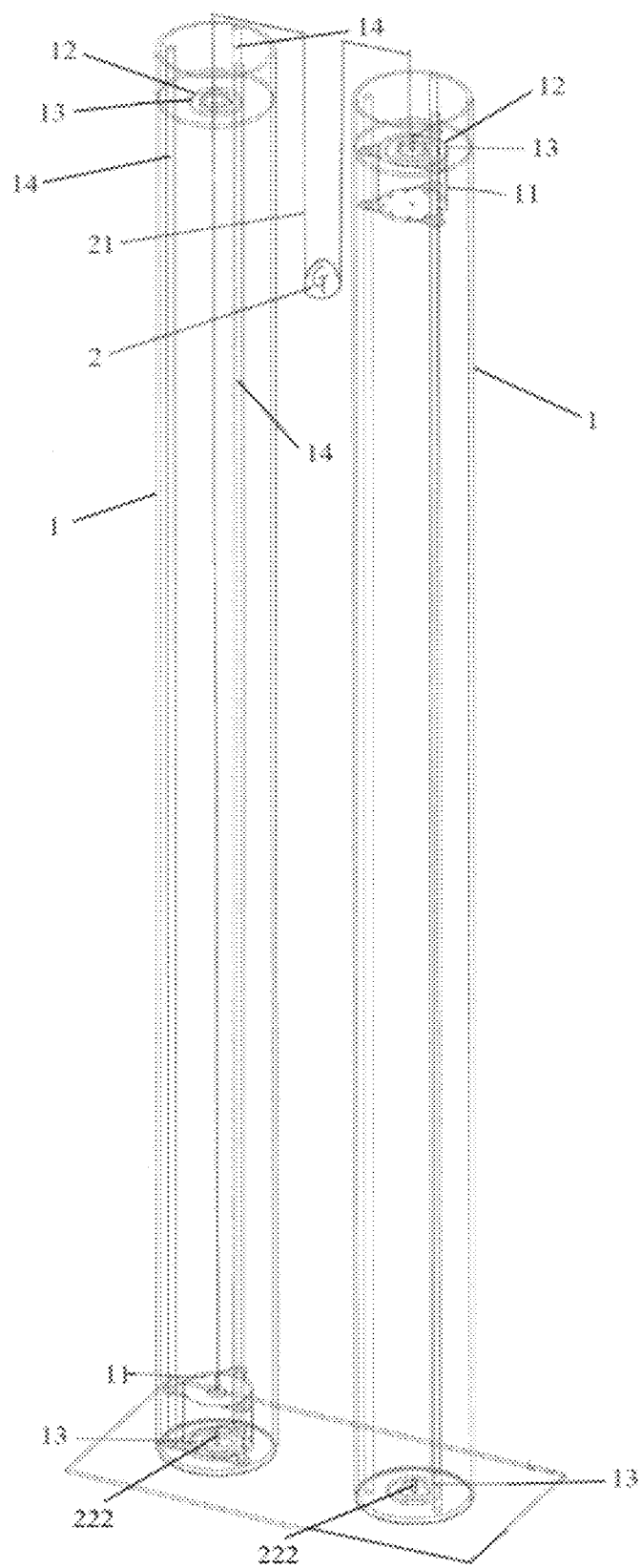
FIG. 1 is an illustrative diagram of an electric power generator having two chambers movable inside two water tanks respectively according to an embodiment disclosed in the present application.
Figure 2:
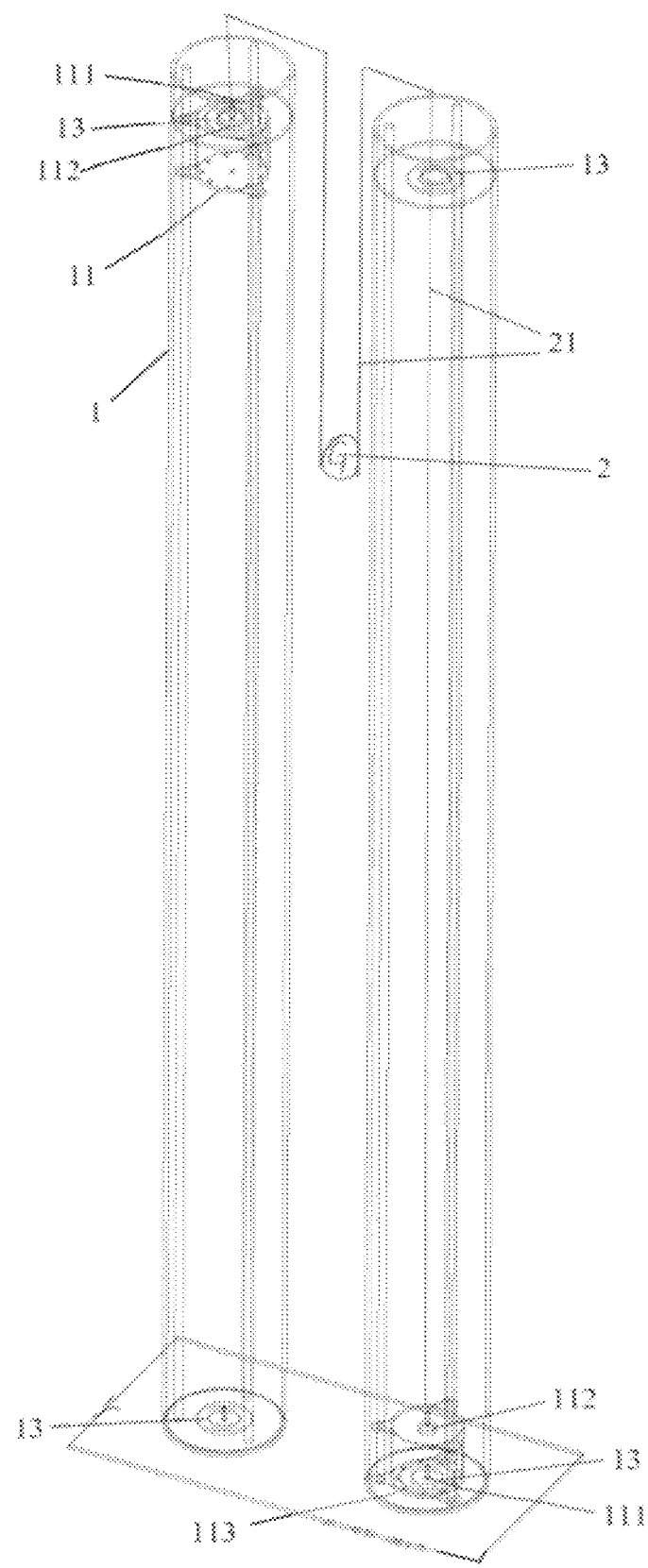
FIG. 2 is an illustrative diagram, of the electric power generator of FIG. 1 with the two chambers in different positions.
Figure 3:
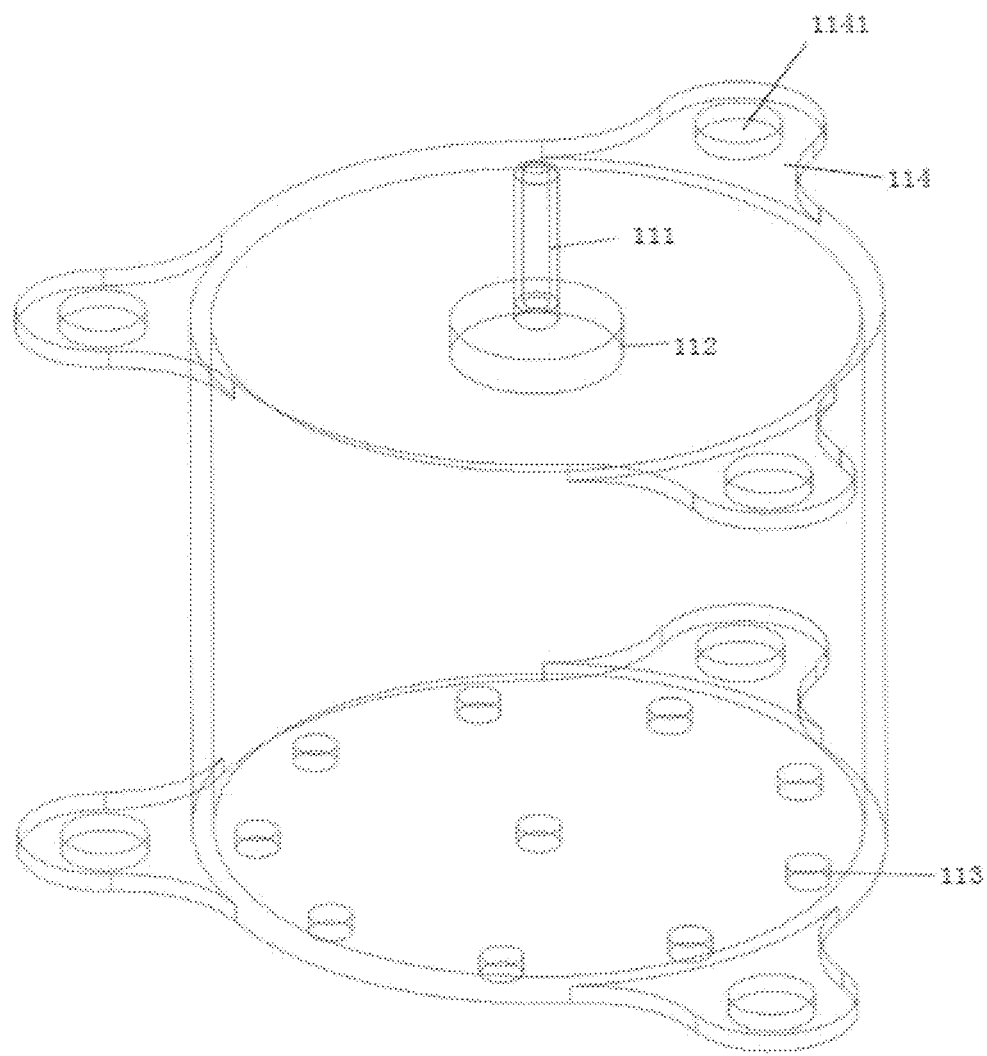
FIG. 3 is an enlarged illustrative diagram of a chamber of the electric power generator according to an embodiment disclosed in the present application.

FIG. 1 is an illustrative diagram of an electric power generator according to an embodiment disclosed in the present application. The electric power generator may include first and second water tanks 1,1. Each water tank 1 contains a column of water. The first and second water tanks 1,1 may be erected side-by-side to each other. First and second compartments or chambers 11,11 are provided inside the first and the second water tanks 1,1 respectively. The first and second chambers 11,11 are arranged such that they can move up and down inside the first and second water tanks 1,1 respectively in opposite directions. That means at the same time when the first chamber 11 moves from the top to the bottom of the first water tank 1, the second chamber 11 moves from the bottom to the top of the second water tank 1, and vice versa.

Each chamber 11 may include a top wall, a bottom wall, and a sidewall extending between the top and the bottom walls. An air outlet 111 can be provided on the top wall of each chamber 11. The air outlet 111 may be defined by a vertical pipe extending upwardly from the top wall of each chamber 11. A pressure valve 112 can be used to cover the air outlet 111. The pressure valve 112 serves as a pressure switch to open or close the air outlet 111 in response to the difference in pressure at both sides of the pressure valve 112. When the pressure valve 112 is open, air inside the chamber 11 may flow out of the chamber 11 through the air outlet 111. A plurality of apertures 113, defining both water inlets and outlets, are formed on the bottom wall of the chamber 11. The plurality of apertures 113 allows water to flow in or out of the chamber 11.

The electric power generator may include an air inlet pipe 222 provided at the bottom of each water tank 1 through which air is pumped into the chamber 11. When the chamber 11 is at the bottom of the water tank 1, the air inlet pipe 222 can be inserted into the chamber 11 through a central opening formed at the center of the bottom wall of the chamber 11.

The electric power generator may further include a plurality of ear loops 1141 formed around the periphery of each chamber 11 and a plurality of vertical guide posts 14 formed inside each water tank 1, the vertical guide posts 14 being inserted through corresponding ear loops 1141 for slidable engagement therewith. Hence, each chamber 11 can steadily slide up and down inside its water tank 1 along the vertical guide post 14. According to the illustrated embodiment, there are three guide posts 14 and three pairs of vertically spaced ear loops 1141 formed equidistantly around each chamber 11.

According to the illustrated embodiment, the first and second water tanks 1,1 and the first and second chambers 11,11 are cylindrical in shape, though they may be in any other possible shape. Each chamber 11 may have a height of about 1 meter and a diameter of about 2 meters. Each water tank 1 may have a height of at least 30 meters.

It is contemplated that higher water tank can result in greater gravitational force to drive the electric motor 2 during each downward movement of the chamber 11 from the top to the bottom of the water tank 1.

The electric power generator includes an electric motor 2. The electric motor 2 can be drivably connected to first and second chains 21 from which the first and second chambers 11 are hung respectively. The first and second chains 21 connect the first and the second chambers 11 to the electric motor 2 such that downward movement of the first and second chambers 11 can drive the electric motor 2 to generate electric power.

An upper electromagnetic holding device 13 can be provided at the top of each water tank 1 for holding or releasing the chamber 11. When energized, the upper electromagnetic holding device 13 can hold the chamber 11 at the top of the water tank 1 where its pressure valve 112 is opened, air inside the chamber 11 is expelled through its air outlet pipe 111 and water is drawn into the chamber 11 through the apertures 113. When de-energized, the upper electromagnetic holding device 13 can release the chamber 11 thereby allowing it to drop by gravity to the bottom of the water tank 1 and drive the electric motor 2 by the chain 21 to generate electric power.

In addition, a lower electromagnetic holding device 13 provided at the bottom of each water tank 1 for holding or releasing the chamber 11. When energized, the lower electromagnetic holding device 13 can hold the chamber 11 at the bottom of the water tank 1 where air is pumped into the chamber 11 from the air inlet pipe 222 provided at the bottom of the water tank 1 and water is expelled from the apertures 113. When de-energized, the lower electromagnetic holding device 13 can release the chamber 11 thereby allowing it to float by buoyancy back to the top of the water tank 1.

Each of the upper and lower electromagnetic holding device 13 can have a permanent magnet and an electromagnet by which the field of the permanent magnet can be selectively counteracted or increased in a conventional manner to achieve holding and releasing functions.

It is appreciated that the electromagnetic holding force generated by each electromagnetic holding device 13 should be greater than the weight of one chamber 11. It is also appreciated that the weight of the first chamber 11 can be the same as the weight of the second chamber 11.

Although it has been shown and described that the electric holding devices 13 are electromagnetic holding devices, it is understood by one skilled in the art that the electric holding devices 13 can be other possible electric holding devices such as electro-mechanic holding devices. The electro-mechanic holding devices can be activated or de-activated and the chamber 11 can be held by any possible mechanical holding mechanisms such as releasable hooks or the like.

The continuous up and down movement of the first and second chambers 11 in opposite directions can alternately and continuously drive the electric motor 2 to generate electric power.

The upper and lower electromagnetic holding devices 13 can be connected to a power source through a circuitry. The circuitry can be so designed that when the upper electromagnetic holding device 13 of the first chamber 11 and the lower electromagnetic holding device 13 of the second chamber 11 are energized, the upper electromagnetic holding device 13 of the second chamber 11 and the lower electromagnetic holding device 13 of the first chamber 11 are de-energized, and vice versa.

Furthermore, the upper electromagnetic holding device 13 of the first chamber 11 and the lower electromagnetic holding device 13 of the second chamber 11 can be energized or de-energized simultaneously. Similarly, the upper electromagnetic holding device 13 of the second chamber 11 and the lower electromagnetic holding device 13 of the first chamber 11 can be energized or de-energized simultaneously.

The electric power generator can be designed such that when the pressure valve 112 of the first chamber 11 is open, the pressure valve 112 of the second chamber 11 is closed, and vice versa.

The first and second chambers 11,11 and the first and second tanks 1,1 may be made of metal or any other suitable material.

To generate electric power, the first chamber 11 is positioned at the top of the first water tank 1 and the second chamber 11 is positioned at the bottom of the second water tank 1. The upper electromagnetic holding device 13 of the first water tank 1 and the lower electromagnetic holding device 13 of the second water tank 1 are energized simultaneously. When the upper electromagnetic holding device 13 of the first water tank 1 is energized, the first chamber 11 is held at the top of the first water tank 1. The pressure valve 112 of the first chamber 11 is opened, water is drawn into the first chamber 11 through the apertures 113 formed at the bottom of the first chamber 11, and the air inside the first chamber 11 is expelled through the air outlet 111 provided at the top of the first chamber 11.

At the time same, when the lower electromagnetic holding device 13 of the second water tank 1 is energized, the second chamber 13 is held at the bottom of the second water tank 1, air is pumped into the second chamber 11 through the air inlet pipe 222 provided at the bottom of the second water tank 1, and water is expelled out of the second chamber 11 through the apertures 113 formed at the bottom of the second chamber 11.

The upper electromagnetic holding device 13 of the first water tank 1 and the lower electromagnetic holding device 13 of the second water tank 1 are then de-energized simultaneously. When the upper electromagnetic holding device 13 of the first water tank 1 is de-energized, the first chamber 11 is released, thereby allowing the first chamber 11 to drop by gravity to the bottom of the first water tank 1 and pull the chain 21 to drive the electric motor 2 and generate electric power.

At the same time, when the lower electromagnetic holding device 13 of the second water tank 1 is de-energized, the second chamber 11 is released, thereby allowing the second chamber 11 to float by buoyancy to the top of the second water tank 1.

When the first chamber 11 drops to the bottom of the first water tank 1 and the second chamber 11 floats to the top of the second water tank 1, the lower electromagnetic holding device 13 of the first water tank 1 and the upper electromagnetic holding device 13 of the second water tank 1 are energized simultaneously.

When the lower electromagnetic holding device 13 of the first water tank 1 is energized, the first chamber 13 is held at the bottom of the first water tank 1. The pressure valve 112 is closed, air is pumped into the first chamber 11 through the air inlet pipe 222 provided at the bottom of the first water tank 1, and water is expelled out of the first chamber 11 through the apertures 113 formed at the bottom of the first chamber 11.

At the same time, when the upper electromagnetic holding device 13 of the second water tank 1 is energized, the second chamber 13 is held at the top of the second water tank 1 where the pressure valve 112 is opened, water is drawn into the second chamber 11 through the apertures 113 at the bottom of the second chamber 11, and the air inside the second chamber 11 is expelled out of the second chamber 11 through the air outlet 111.

The lower electromagnetic holding device 13 of the first water tank 1 and the upper electromagnetic holding device 13 of the second water tank 1 are then de-energized simultaneously. When the lower electromagnetic holding device 13 of the first water tank 1 is de-energized, the first chamber 11 is released, thereby allowing the first chamber 11 to float by buoyancy back to the top of the first water tank 1.

At the same time when the upper electromagnetic holding device 13 of the second water tank 1 is de-energized, the second chamber 11 is released, thereby allowing the second chamber 11 to drop by gravity to the bottom of the second water tank 1 and pull the chain 21 to drive the electric motor 2 and generate electric power.

Although it has been shown and described that the electric power generator disclosed in the present application has two water tanks 1 and two chambers 11, it is appreciated that only one water tank 1 and one chamber 11 can also drive the electric motor 2 to generate electric power.

To generate electric power utilizing only one water tank and one chamber, the upper electromagnetic holding device 13 of the water tank 1 is held at the top of the water tank 1. The upper electromagnetic holding device 13 is de-energized thereby allowing the chamber 11 to drop by gravity to the bottom of the water tank 1 and pull the chain 21 to drive the electric motor 2 and generate electric power.

The lower electromagnetic holding device 13 of the water tank 1 is energized to hold the water tank 1 at the bottom of the water tank 1. Air is pumped into the chamber 11 and water is expelled therefrom. The lower electromagnetic holding device 1 is then de-energized, thereby allowing the chamber 11 to float by buoyancy back to the top of the water tank 1.

The upper electromagnetic holding device 13 of water tank 13 is energized to hold the chamber 11 at the top of the water tank 1. The pressure valve 111 is opened, water is drawn into and air is expelled out of the chamber 11.

The upper electromagnetic holding device 13 is de-energized, thereby allowing the chamber 11 to drop again by gravity to the bottom of the water tank 1 and pull the chain 21 to drive the electric motor 2 again to generate electric power.

With only one water tank 1 and one chamber 11, the electric motor 2 will be driven by the chain 21 only when the chamber 11 drops from top to the bottom of the water tank 1.

Although it has been shown and described that the two chambers 11, 11 are provided inside two side-by-side water tanks 1, 1 respectively, it is possible that the two chambers 11, 11 can move up and down along two columns of water inside only one water tank, or inside a body of water such as an ocean.

While the electric power generator disclosed in the present application has been shown and described with particular references to a number of preferred embodiments thereof, it should be noted that various other changes or modifications may be made without departing from the scope of the appending claims.

What is claimed is:

1. An electric power generator comprising:
   (a) first and second water tanks;
   (b) first and second chambers movable up and down inside the first and second water tanks respectively in opposite directions, each chamber comprising a top wall having an air outlet covered by a pressure valve, and a bottom wall having a plurality of apertures serving as both water inlets and outlets;

(c) an electric generator drivably connected to first and second chains from which the first and second chambers are hung respectively;

(d) an upper electromagnetic holding device provided at top of each water tank for holding the chamber therein at the top where its pressure valve is opened, water is drawn into the chamber through the apertures and air is expelled out of the chamber through the air outlet, and for releasing the chamber thereby allowing it to drop by gravity to the bottom of the water tank and pull the chain to drive the electric generator; and (e) a lower electromagnetic holding device provided at the bottom of each water tank for holding the chamber therein at the bottom where its pressure valve is closed, air is pumped into the chamber and water is expelled out of the chamber through the apertures, and for releasing the chamber thereby allowing it to float by buoyancy to the top of the water tank;

(f) whereby continuous up and down movement of the first and second chambers in opposite directions alternately and continuously drives the electric generator to generate electric power; wherein the generator further comprises:

(g) a plurality of ear loops formed around the periphery of each chamber and a plurality of vertical guide posts formed inside each water tank, the vertical guide posts being inserted through corresponding ear loops for slidable engagement therewith.

2. The electric power generator as claimed in claim 1, further comprising an air inlet pipe provided at the bottom of each water tank through which air is pumped into each chamber, the air inlet pipe being insertable into the chamber through a central opening formed at the center of the bottom wall of the chamber.

3. The electric power generator as claimed in claim 1, wherein each water tank has a height of at least 30 meters.

4. The electric power generator as claimed in claim 1, wherein the first and second water tanks and the first and second chambers are cylindrical in shape.

5. The electric power generator as claimed in claim 4, wherein each chamber has a height of about 1 meter and a diameter of about 2 meters.

6. The electric power generator as claimed in claim 1, wherein the weight of the first chamber is the same as the weight of the second chamber.

7. An electric power generator comprising:
(a) first and second chambers movable up and down inside two columns of water respectively in opposite directions, each chamber comprising a top wall having an air outlet covered by a pressure valve, and a bottom wall having a plurality of apertures serving as both water inlets and outlets;
(b) an electric generator drivably connected to first and second chains from which the first and second chambers are hung respectively;
(c) an upper electric holding device provided at top of each column of water for holding the chamber therein at the top where its pressure valve is opened, water is drawn into the chamber through the apertures and air is expelled out of the chamber through the air outlet, and for releasing the chamber thereby allowing it to drop by gravity to the bottom of the column of water and pull the chain to drive the electric generator; and
(d) a lower electric holding device provided at the bottom of each column of water for holding the chamber therein at the bottom where its pressure valve is closed, air is pumped into the chamber and water is expelled out of the chamber through the apertures, and for releasing the chamber thereby allowing it to float by buoyancy to the top of the column of water;
(e) whereby continuous up and down movement of the first and second chambers in opposite directions alternately and continuously drives the electric generator to generate electric power; wherein the generator further comprises:
(f) a plurality of ear loops formed around the periphery of each chamber and a plurality of vertical guide posts formed inside each water tank, the vertical guide posts being inserted through corresponding ear loops for slidable engagement therewith.

8. The electric power generator as claimed in claim 7, further comprising an air inlet pipe provided at the bottom of each column of water through which air is pumped into each chamber, the air inlet pipe being insertable into the chamber through a central opening formed at the center of the bottom wall of the chamber.

9. The electric power generator as claimed in claim 7, wherein each column of water has a height of at least 30 meters.

10. The electric power generator as claimed in claim 7, wherein each column of water is contained in a water tank.

11. The electric power generator as claimed in claim 10, wherein the water tanks and the chambers are cylindrical in shape.

12. The electric power generator as claimed in claim 11, wherein each chamber has a height of about 1 meter and a diameter of about 2 meters.

13. A method of generating electric power comprising the steps of:
(a1) providing a first chamber movable up and down inside a first water tank, the first chamber comprising a top wall having an air outlet covered by a first pressure valve, and a bottom wall having a plurality of apertures serving as both water inlets and outlets;
(b1) providing an electric generator drivably connected to a first chain from which the first chamber is hung;
(c1) providing upper and lower electric holding devices at top and bottom of the first water tank respectively for holding or releasing the first chamber;
(d1) de-activating the upper electric holding device of the first water tank that is holding the first chamber at the top of the first water tank, thereby allowing the first chamber to drop by gravity to the bottom of the first water tank and pull the first chain to drive the electric generator and generate electric power;
(e1) activating the lower electric holding device of the first water tank to hold the first chamber at the bottom of the first water tank, and pumping air into the first chamber thereby expelling water out of the first chamber through the apertures;
(f1) de-activating the lower electric holding device of the first water tank thereby allowing the first chamber to float by buoyancy back to the top of the first water tank;
(g1) activating the upper electric holding device of the first water tank to hold the first chamber at the top of the first water tank, and opening the first pressure valve thereby drawing water into the first chamber through the apertures and expelling air out of the first chamber through the air outlet; and
(h1) repeating the steps (d1) to (g1);
further comprising the steps of:
(a2) providing a second chamber movable up and down inside a second water tank, the second chamber comprising a top wall having an air outlet covered by a pressure valve, and a bottom wall having a plurality of apertures serving as both water inlets and outlets;

(b2) drivably connecting the electric generator to a second chain from which the second chamber is hung;

(c2) providing upper and lower electric holding devices at top and bottom of the second water tank respectively for holding or releasing the second chamber;

(d2) de-activating the upper electric holding device of the second water tank that is holding the second chamber at the top of the second water tank, thereby allowing the second chamber to drop by gravity to the bottom of the second water tank and pull the second chain to drive the electric generator and generate electric power;

(e2) activating the lower electric holding device of the second water tank to hold the second chamber at the bottom of the second water tank, and pumping air into the second chamber through the air inlet provided at the bottom of the second water tank thereby expelling water out of the second chamber through the apertures;

(f2) de-activating the lower electric holding device of the second water tank thereby allowing the second chamber to float by buoyancy back to the top of the second water tank;

(g2) activating the upper electric holding device of the second water tank to hold the second chamber at the top of the second water tank, and opening the second pressure valve thereby drawing water into the second chamber through the apertures and expelling air out of the second chamber through the air outlet;

(h2) repeating the steps (d2) to (g2) such that the continuous up and down movement of the first and second chambers in opposite directions alternately and continuously drive the electric generator to generate electric power; and (i) providing a plurality of ear loops formed around the periphery of each chamber and a plurality of vertical guide posts formed inside each water tank, the vertical guide posts being inserted through corresponding ear loops for slidable engagement therewith.

14. The method as claimed in claim 13, wherein when the pressure valve of the first chamber is open, the pressure valve of the second chamber is closed, and vice versa.

15. The method as claimed in claim 13, wherein the upper electric holding device of the first chamber and the lower electric holding device of the second chamber are activated or deactivated simultaneously; and the upper electric holding device of the second chamber and the lower electric holding device of the first chamber are activated or de-activated simultaneously.

16. The method as claimed in claim 13, wherein when the upper electric holding device of the first chamber and the lower electric holding device of the second chamber are activated, the upper electric holding device of the second chamber and the lower electric holding device of the first chamber are de-activated, and vice versa.

17. The method as claimed in claim 13, wherein the electric holding devices are electromagnetic holding devices, whereby the chambers are held by electromagnetic force generated by the electromagnetic holding devices.

* * * * *